United States Patent [19]
Isomura et al.

[11] Patent Number: 6,022,046
[45] Date of Patent: Feb. 8, 2000

[54] AIR BAG APPARATUS

[75] Inventors: Motoi Isomura; Yoshiyuki Fujita; Hiroyuki Kobayashi, all of Aichi, Japan

[73] Assignee: Toyoda Gosei Co., Ltd., Aichi, Japan

[21] Appl. No.: 08/938,999

[22] Filed: Sep. 26, 1997

[30] Foreign Application Priority Data

Sep. 26, 1996 [JP] Japan ................................. 8-254901

[51] Int. Cl.⁷ .............................................. B60R 21/20
[52] U.S. Cl. ..................................... 280/743.2; 280/731
[58] Field of Search ............................. 280/743.2, 740, 280/731, 728.2

[56] References Cited

U.S. PATENT DOCUMENTS

| | | | |
|---|---|---|---|
| 5,573,270 | 11/1996 | Sogi et al. | 280/740 |
| 5,678,858 | 10/1997 | Nakayama et al. | 280/743.2 |
| 5,848,805 | 12/1998 | Sogi et al. | 280/743.2 |

FOREIGN PATENT DOCUMENTS 8-104195   4/1996   Japan .

*Primary Examiner*—Kenneth R. Rice
*Attorney, Agent, or Firm*—Pillsbury Madison & Sutro LLP

[57] ABSTRACT

An air bag apparatus including an air bag to be inflated with inflation gas flowing therein through a gas inlet, a tether structure disposed inside the air bag for limiting inflation thereof, a diffuser disposed inside the air bag for limiting and directing flow of inflation gas and having a gas in-flowing hole corresponding to the air bag gas inlet, a retainer disposed inside the air bag about the periphery of the air bag gas inlet, and a bag holder disposed outside and beneath the air bag and extending about the periphery of the air bag gas inlet. The bag holder is fastened to the retainer such that a portion of the air bag is retained between the bag holder and the retainer. The retainer is connected to the diffuser so that the retainer and the diffuser constitute a sub-assembly, thus allowing the sub-assembly to be inserted into the air bag through the gas inlet. The diffuser also includes connecting portions attaching to the retainer to prevent the diffuser from disconnecting from the retainer.

7 Claims, 7 Drawing Sheets

AIR BAG APPARATUS

BACKGROUND OF THE INVENTION

1. Field of the Invention

The present invention relates to an air bag apparatus for use in a vehicle, and particularly relates to an air bag apparatus having a tether for limiting the inflated shape of the air bag and a diffuser for limiting the flow of inflation gas into the air bag.

2. Description of the Related Art

Japanese Patent Publication No. Hei. 8-104195 discloses an air bag apparatus having a tether 61 with a diffuser region 63 for limiting the inflated shape of an air bag 62 and for limiting the flow of an inflation gas. The tether 61 is disposed in the air bag 62 as shown in FIGS. 10 and 11. FIG. 10 is a sectional view of the inflated air bag 62 taken along the line I—I in FIG. 11. FIG. 11 is a top plan view of the air bag 62.

In the air bag 62 disclosed in the above Publication, the tether 61 is disposed so that the periphery of the gas inlet 64 is connected to a top wall portion opposite the gas inlet 64. 67 designates an inflator.

The tether 61 is stitched to the periphery of the gas inlet 64 along a stitched region 65 of the gas inlet side of the air bag 62 so that the diffuser region 63 of the tether 61 is disposed above the gas inlet 64. A region between a non-stitched portion of the tether 61 and the periphery of the gas inlet 64 is provided as a gas communication region 66 allowing the inflation gas to flow into the air bag. In the stitched region 65, the tether 61 is extended and tether 61 is also stitched to the top wall of the air bag 62.

That is, in the air bag 62 disclosed in the above Publication, the diffuser region 63 of the tether 61 is disposed above the gas inlet 64 of the air bag 62 so that the tether 61 also limits the flow of inflation gas into the air bag 62.

When the inflation gas flows into the air bag 62 through the gas inlet 64, the inflation gas flows into the air bag 62 via the open and non-stitched gas communication region 66, such that the air bag 62 is inflated into a shape limited by the tether 61.

In such an air bag 62, however, predetermined portions of the tether 61 need to be stitched to the top wall and about the periphery of the gas inlet 64. Because the tether 61 is disposed inside the air bag 62, so that the diffuser region 63 of the tether 61 is above the gas inlet 64, it is difficult to perform the stitching work. Thus, because the stitching is difficult is perform, it is likewise difficult to dispose the tether 61 with the diffuser region 63 inside the air bag 62.

SUMMARY OF THE INVENTION

In order to solve the aforementioned problem, it is an object of the present invention to provide an air bag apparatus in which a retainer is used when assembling the air bag apparatus so that a diffuser can be disposed easily in an air bag having a tether disposed therein.

According to the present invention, the air bag apparatus includes an air bag to be inflated with inflation gas flowing therein through a gas inlet, a tether disposed inside the air bag for limiting the inflation thereof, a diffuser disposed inside the air bag for limiting flow of the inflation gas and having a gas flowing hole corresponding to the gas inlet. In addition, a retainer is disposed inside the air bag about the periphery of the gas inlet, and a bag holder is disposed outside the air bag about the periphery of the gas inlet. The bag holder is fastened to the retainer such that a portion of the air bag is retained between the bag holder and the retainer. The retainer is connected to the diffuser so that the retainer and the diffuser together constitute a sub-assembly that can be inserted into the air bag through the gas inlet.

The aforementioned air bag apparatus may further comprise a diffuser having connecting portions attached to the retainer thereby preventing the diffuser from being disconnected from the retainer. The diffuser has openings through which the inflation gas flows out at opposite ends.

In the air bag apparatus according to the present invention, if a tether is disposed in an air bag in advance and a diffuser is attached to a retainer, not only can the air bag be retained on a bag holder but the diffuser can also be attached and fixed within the air bag firmly by fastening the retainer to the bag holder by bolts or other securing devices. The retainer, having the diffuser attached thereto, is disposed in the air bag through the gas inlet at the time of assembling with the bolts projecting through holes provided on the diffuser. The air bag is folded, and the bolts are passed through holes provided on the air bag and through the mounting holes of the bag holder and fastened with, for example, a nut.

After assembly, when inflation gas flows into the air bag through the air bag gas inlet, the gas enters the diffuser via the gas flowing hole of the diffuser that is disposed in a position corresponding to the gas inlet. Further, the inflation gas flows out of openings at opposite ends of the diffuser, so that the air bag is inflated to the shape limited by the tether.

Accordingly, in the air bag apparatus according to the present invention because the diffuser is connected to the retainer in advance, the diffuser can be attached and easily fixed in the inside of the air bag easily.

The diffuser employed in the air bag apparatus according to the present invention and disposed in the air bag need not be formed from a sheet-like cloth material but rather from cloth material formed such that the diffuser takes a cylindrical shape when the air bag apparatus is inflated. Bolts are inserted into the holes provided on the diffuser to firmly fit the diffuser to the retainer and the retainer is disposed in the air bag via the gas inlet.

Preferably, in the air bag apparatus according to the present invention, the diffuser disposed in the air bag takes a generally cylindrical shape when the air bag apparatus is inflated. Even in the case where an intensive tensile force acts on the air bag due to the inflow of inflation gas into the air bag, the tensile force is diffused by the periphery of the holes provided on the diffuser with the bolts of the retainer inserted therein with the cylindrical diffuser providing structure to permit the diffused forces to counteract each other. Accordingly, the air bag apparatus has a high tearing strength.

When using sheet-like diffusers, where the opposite ends are, in effect, cut off along part of the periphery adjacent to the holes provided on the diffuser, the corner portions at opposite ends of the sheet-like diffuser can be pulled so that the periphery of the holes may become separated for the securing bolts.

Additionally, in the air bag apparatus according to the present invention, the diffuser is disposed in the inside of the air bag by inserting bolts of the retainer into the holes provided on the diffuser, the air bag, and the bag holder. If the holes through which the bolts are inserted are disposed suitably, the axial direction of the diffuser can be changed. Accordingly, by changing the axial direction of the diffuser, the direction of limiting the flow of the inflation gas can be changed easily.

Further, in the case where connecting portions are provided on the diffuser to prevent it from being disconnected from the retainer, the diffuser can be fitted to the retainer and disposed inside of the air bag before the bolts of the retainer are fastened with nuts to the bag holder. Accordingly, the work of assembling the air bag apparatus can be carried out more easily because the diffuser and the retainer can be inserted into the air bag as one sub assembly.

DETAILED DESCRIPTION OF THE PREFERRED EMBODIMENT

The present invention will be described below with reference to the above identified drawings.

Figure 1:
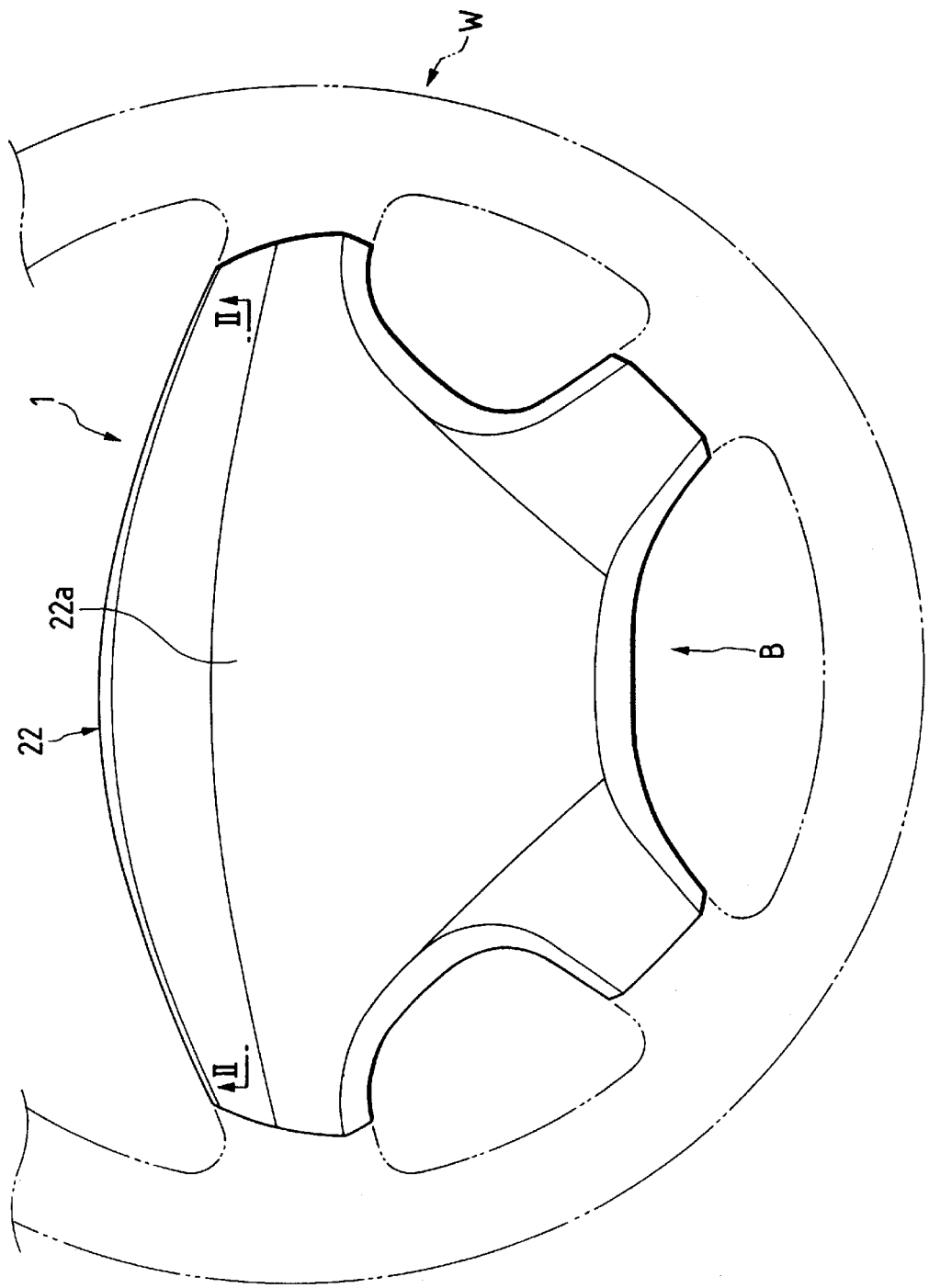
FIG. 1 is a plan view of part of a steering wheel including an air bag apparatus showing an embodiment of the present invention.
Figure 2:
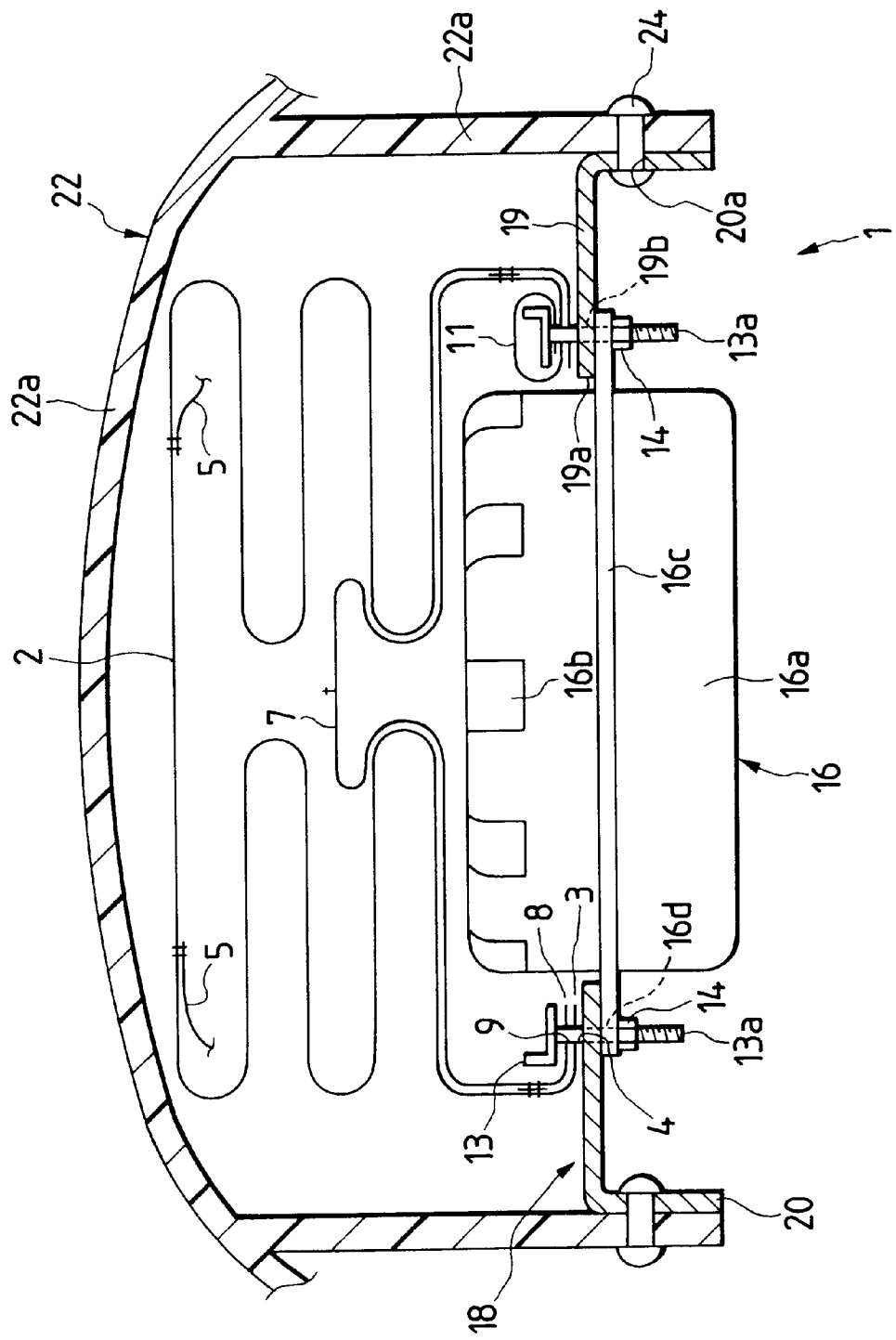
FIG. 2 is a sectional view taken along the line II—II in FIG. 1.

In the present invention, an air bag apparatus or device 1 is disposed above a boss portion B in the center of a steering wheel W as shown in FIG. 1. As shown in FIG. 2, the air bag apparatus 1 includes an air bag 2 that has been folded in a state where tethers 5, 5 and a diffuser 7 are disposed inside the air bag 2. Also included is an inflator 16 for supplying inflation gas to the air bag 2 and a cover 22 for covering the folded air bag 2. In addition, a bag holder 18 holds the air bag 2 and secures to it the inflator 16, the cover 22, and a retainer 13 for retaining the air bag 2 and the diffuser 7 on the bag holder 22.

The cover 22 is formed of a synthetic resin such as thermoplastic elastomer, or the like, and includes a top wall 22a and side walls 22b extended from the lower surface of the top wall 22a. A thin rupture or tear seam portion (not shown) is formed in the top wall 22a so that the top wall 22a is opened easily when the air bag 2 is inflated.

The bag holder 18 is formed, for example, of a metal plate and has a rectangular bottom wall 19 and side walls 20 extending downwardly from the outer circumferential edge of the bottom wall 19. A circular center hole 19a is formed in the center of the bottom wall 19 so that a body 16a (which will be described later) of the inflator 16 can be inserted into the center hole 19a from below. Mounting holes 19b are formed in the periphery of the center hole 19a so that four bolts 13a (which will be described later) of the retainer 13 can be inserted into the mounting holes 19b respectively. Mounting holes 20a are formed in the side walls 20 so that the side walls 22b of the cover 22 can be fixed by rivets 24 in order to hold the cover 22 over the air bag 2.

Screw holes (not shown) are formed in predetermined positions of the side walls 20 of the bag holder 18 so that the air bag apparatus 1 is fixed to a mandrel (not shown) of the steering wheel W and attached onto the boss portion B of the steering wheel W.

The inflator 16 has a columnar body 16a provided with gas discharge openings 16b at its upper portion, and a flange portion 16c projecting from the body 16a. Mounting holes 16d are formed in the flange portion 16c so that the bolts 13a of the retainer 13 are inserted through the mounting holes 16b respectively.

Figure 5:
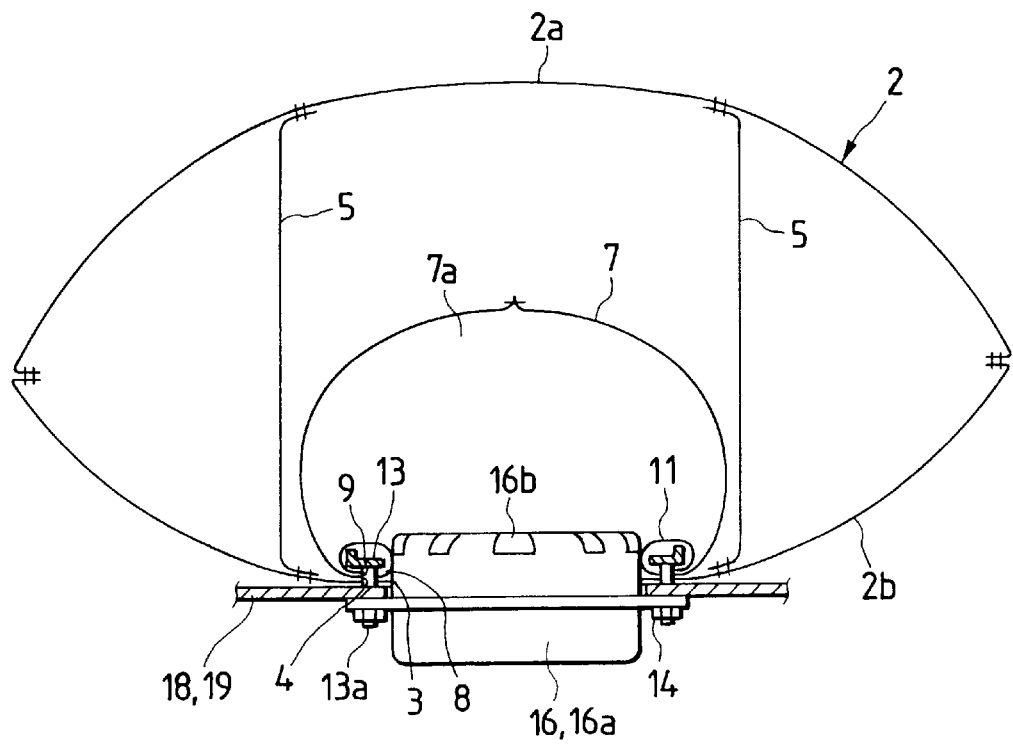
FIG. 5 is a cross-sectional view showing the air bag inflated.

As seen in FIG. 5, where the air bag is deployed, the air bag 2 is formed by stitching the outer circumferential edges of a nearly circular top wall portion 2a to a bottom wall portion 2b, both of which are formed from woven cloth. A circularly opened gas inlet 3 is formed in the center of the bottom wall portion 2b. Four mounting holes 4 are formed in the air bag 2 in the periphery of the gas inlet 3 so that the bolts 13a of the retainer 13 can be inserted through the mounting holes 4. The gas inlet 3 has an inner diameter slightly larger than the outer diameter of the body of the inflator 16.

Further, two tethers 5, 5 are disposed inside the air bag 2 and are stitched in a region of the bottom wall 2b around the gas inlet 3 and in a nearly central region of the top wall portion 2a. The tethers 5, 5 are formed from woven cloth of, for example, polyester, or the like, which is the same material for the top wall and bottom wall portions 2a and 2b of the air bag 2.

The air bag 2 can be produced easily through a process in which end portions of the tethers 5, 5 are stitched to the bottom wall portion 2b. The outer circumferential edges of the top wall and bottom wall portions 2a and 2b are stitched to each other and then the air bag 2 is turned inside out, by using the gas inlet 3, and the top wall portion 2a is stitched to the opposite end portions of the tethers 5, 5 using the opening of the gas inlet 3 to provide access into the air bag 2.

Figure 3:
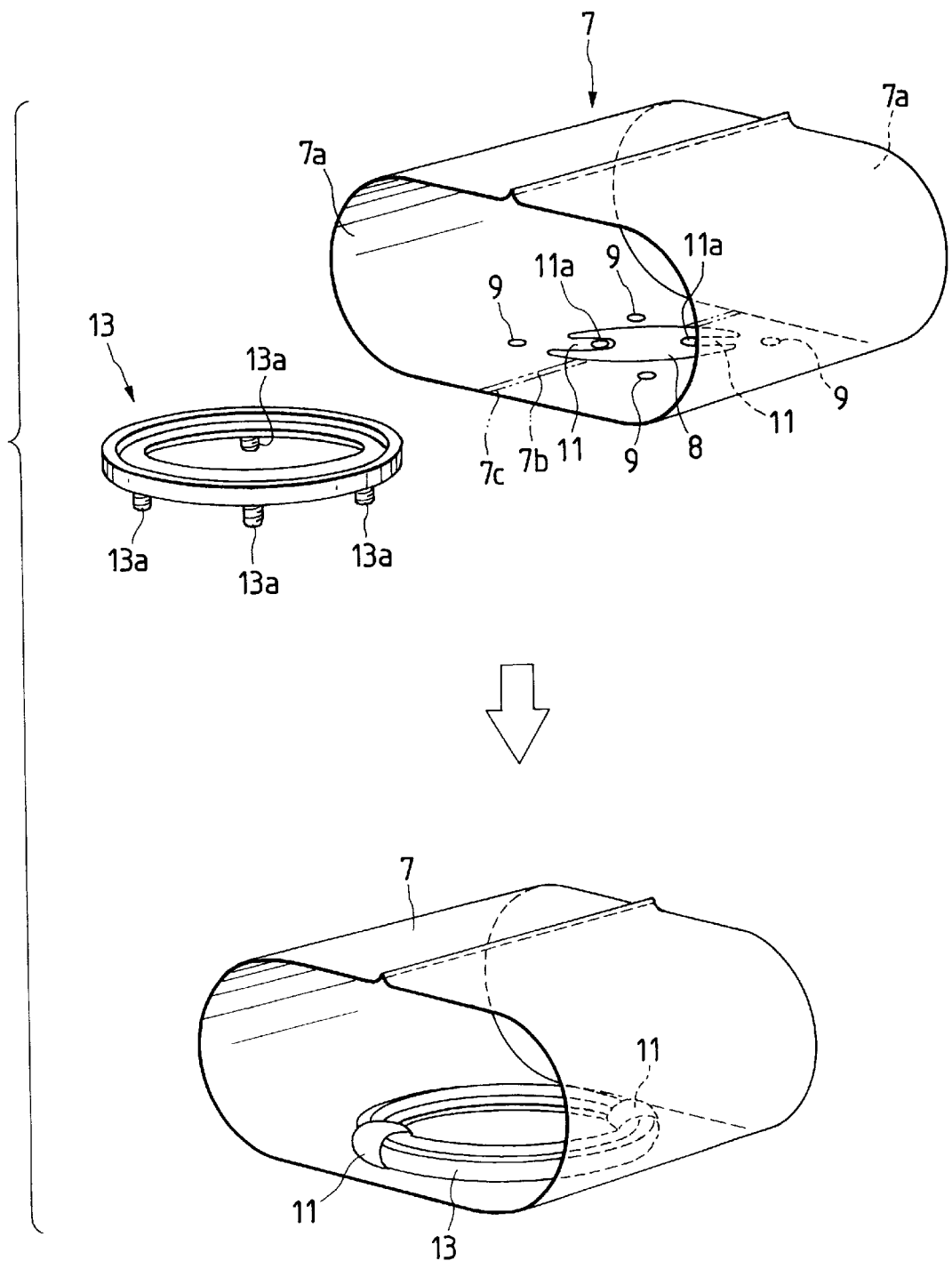
FIG. 3 is a partially exploded view showing a retainer and a diffuser and shows the retainer and the diffuser fitted to each other.

As shown in FIGS. 2 and 3, the retainer 13 is a ring formed from an annular metal plate provided with a circular opening and having substantially the same diameter as that of the gas inlet 3. Four bolts 13a are fixed to the retainer 13 so that the bolts 13a extend downwardly and are able to be inserted through the mounting holes 9 (which will be described later) provided on the diffuser 7, through the mounting holes 4 of the air bag 2, through the mounting holes 19b of the bag holder 18 and through the mounting holes 16d of the inflator 16. The respective bolts 13a are preferably disposed at equal intervals of 90° around the center of the retainer 13.

The diffuser 7 is designed to be cylindrically shaped when the air bag apparatus 1 is deployed and is preferably formed of woven cloth such as, for example, polyester or other synthetic material. As shown in FIGS. 2 and 3, the diffuser 7 has a gas flowing hole 8 with a diameter the same as the diameter of the air bag gas inlet opening 3. Mounting holes 9 are formed in the diffuser around the periphery of the gas flowing hole 8 so that bolts 13a of the retainer 13 can be inserted into the mounting holes 9.

Figure 4:
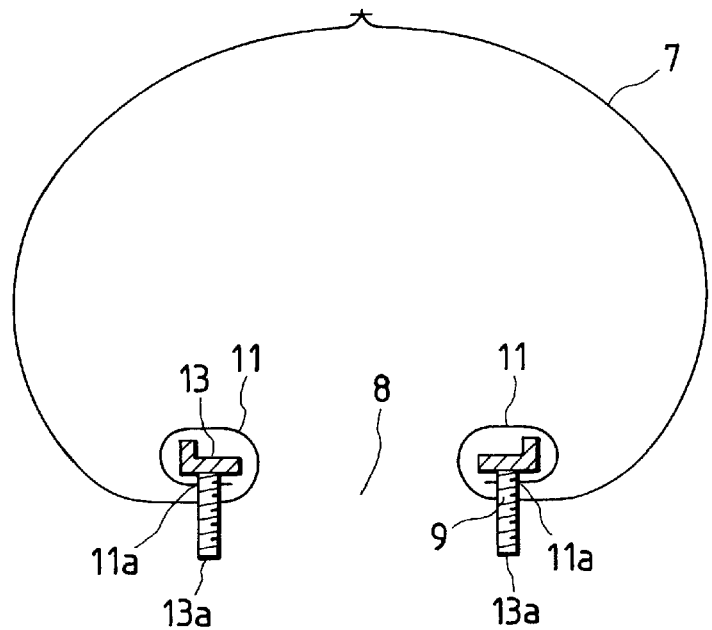
FIG. 4 is a cross-sectional view of the retainer and the diffuser fitted to each other illustrating the connecting portions.

The diffuser 7 also has connecting portions 11, provided with lock holes 11a, that project inwardly from symmetrical positions along the periphery of the gas flowing hole 8, as means for preventing the diffuser 7 from being disconnected from the retainer 13. These connecting portions 11 are designed to wrap around the retainer 13 with the bolts 13a of the retainer 13 being first inserted in hole 11a and then bolts 13a can be inserted into the mounting holes 9 such that the inner and outer surfaces of the retainer 13 are enclosed by the connecting portions 11 as shown in FIG. 4.

Assembling of the air bag apparatus 1 in this embodiment will be described below. The bolts 13a are inserted into the mounting holes 9 so that the diffuser 7 is fitted to the retainer 13 as shown in FIGS. 3 and 4. Before the bolts 13a, however, are inserted into the mounting holes 9, the bolts 13a will have been inserted into the lock holes 11a such that the inner and outer circumferences of the retainer 13 are wrapped and enclosed by the connecting portions 11.

Next, the retainer 13, with the diffuser 7 fitted thereto, is inserted into the air bag 2 through the gas inlet 4. Bolts 13a of the retainer 13 are inserted through the mounting holes 4. As shown in FIG. 2, the air bag 2 is then folded together with the diffuser 7.

The body 16a of inflator 16 is then inserted into the mounting hole 19a of the bag holder 18. The bolts 13a of the retainer 13, which have been inserted into the mounting holes 9 of the diffuser 7 and the mounting holes 4 of the air bag 2, are then inserted into the mounting holes 19b of the bag holder 18 and into the mounting holes 16d of the inflator 16 and fixed with nuts 14. In this way, the air bag 2 is held on the bag holder 18 and the diffuser 7 is firmly mounted and fixed inside the air bag 2.

When the air bag 2 is covered with the cover 22 and the side wall 22b is fixed to the side wall 20 of the bag holder 18 by rivets 24, the air bag apparatus 1 is assembled. The air bag apparatus 1 is then fixed to the mandrel of the steering wheel W by using the screw holes (not shown) of the bag holder 18.

Inflation gas, when discharged from the gas discharge openings 16b of the inflator 16, flows into the air bag 2 through the air bag gas inlet 3. The inflation gas enters into the cylindrical diffuser 7 via the gas flowing hole 8 of the diffuser 7. The inflation gas flows out of the openings 7a, 7a at opposite ends of the columnar or cylindrical diffuser and the air bag 2 is inflated to a shape limited by the tethers 5, 5 as shown in FIG. 5.

In the air bag apparatus 1 according to the first embodiment, the diffuser 7 disposed in the air bag 2 is cylindrical in shape or form when the air bag is deployed. As such, where an intensive tensile force acts on the air bag due to the inflow of the inflation gas into the air bag, the tensile force is diffused through the diffuser 7 about the periphery of the mounting holes 9 through which bolts 13a extend and about the region connected to the diffuser 7. In effect, the forces applied throughout the diffuser 7 join or met about the points of connection to retainer 13 and air bag 2. The mounting holes 9 are preferably symmetrically aligned to evenly diffuse the tensile force throughout the periphery of the mounting holes 9. This collective effect provides an air bag apparatus 1 that exhibits a higher tear strength.

In the air bag apparatus 1 as described above, if the mounting holes 9 are disposed suitably, the bolts 13a of the retainer 13 can be inserted into the mounting holes 9 in various alignments, thus allowing the axial direction of the diffuser 7 to be changed. Accordingly, by changing the axial direction of the diffuser 7, the direction of limiting the flow of the inflation gas can likewise be changed. Although the embodiment has shown the case where the openings 7a, 7a of the diffuser 7 are facing in the front and rear of the steering wheel W, the openings 7a, 7a of the diffuser 7 may also face toward the left and right of the steering wheel W if the diffuser 7 is disposed so as to be shifted by 90°.

In the air bag apparatus 1 described above, the diffuser 7 also has connecting portions 11, provided with lock holes 11a, that project inwardly along the periphery of the gas flowing hole 8. These connecting portions 11 are designed to wrap around the retainer 13 with the bolts 13a of the retainer 13 being first inserted in hole 11a and then bolts 13a can be inserted into the mounting holes 9 such that the inner and outer surfaces of the retainer 13 are enclosed by the connecting portions 11 as shown in FIG. 4, thereby preventing disconnection of the diffuser 7 from the retainer 13.

Further, the bolts 13a are inseparable from the retainer 13. Therefore, the connecting portions 11 of the diffuser 7 can be wound around the retainer before the retainer 13 is disposed within the air bag 2. Thus, it is easier to assemble the air bag apparatus 1.

Figure 6:
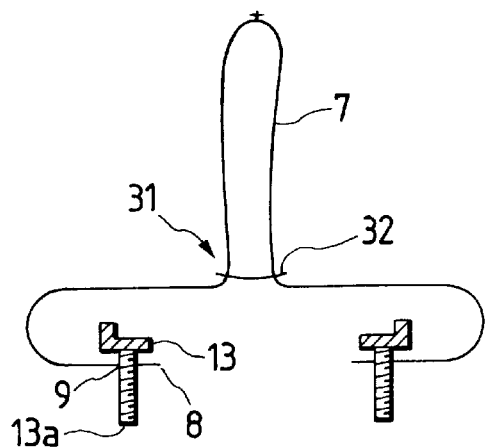
FIG. 6 is a cross-sectional view showing a modification of the diffuser.

The diffuser 7 shown in FIG. 6 is designed so that after the diffuser 7 is fitted to the retainer 13, the diffuser 7 is temporarily fixed by a stitch 32 and a tack 31 provided in the circumferential surface of the diffuser 7. The strength of the stitch 32 is selected so that the stitch can be ruptured easily when the inflation gas flows into the diffuser 7.

Figure 7:
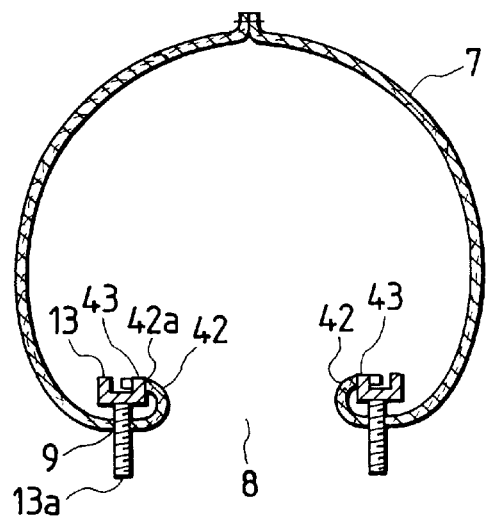
FIG. 7 is a cross-sectional view showing a modified example of the connecting portions of the diffuser.

Alternatively, the connecting portions of the diffuser may be configured as shown in FIG. 7.

The connecting portions 41 shown in FIG. 7 include short tongue pieces 42 having lock holes 42a, provided so as to be symmetrical with respect to the center of the gas flowing hole 8 in diffuser 7, and lock protrusions 43 provided in the inner circumferential side of the retainer 13 so as to be engaged with lock holes 42a. In this configuration, the lock holes 42a are engaged with the lock protrusions 43 when the diffuser 7 is fitted to the retainer 13, thereby fastening the diffuser 7 to the retainers. Also in this case, the diffuser 7 can be fit snugly to the retainer 13 before disposing the retainer 13 within the air bag 2, again simplifying assembly the air bag apparatus 1.

Figure 8:
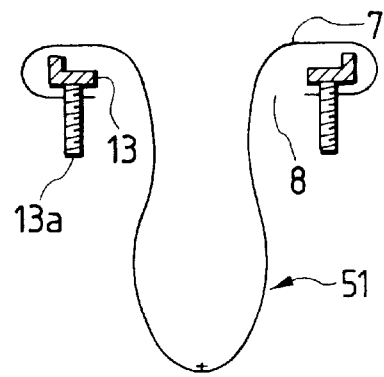
FIG. 8 is a cross-sectional view showing a further modification of the diffuser.
Figure 9:
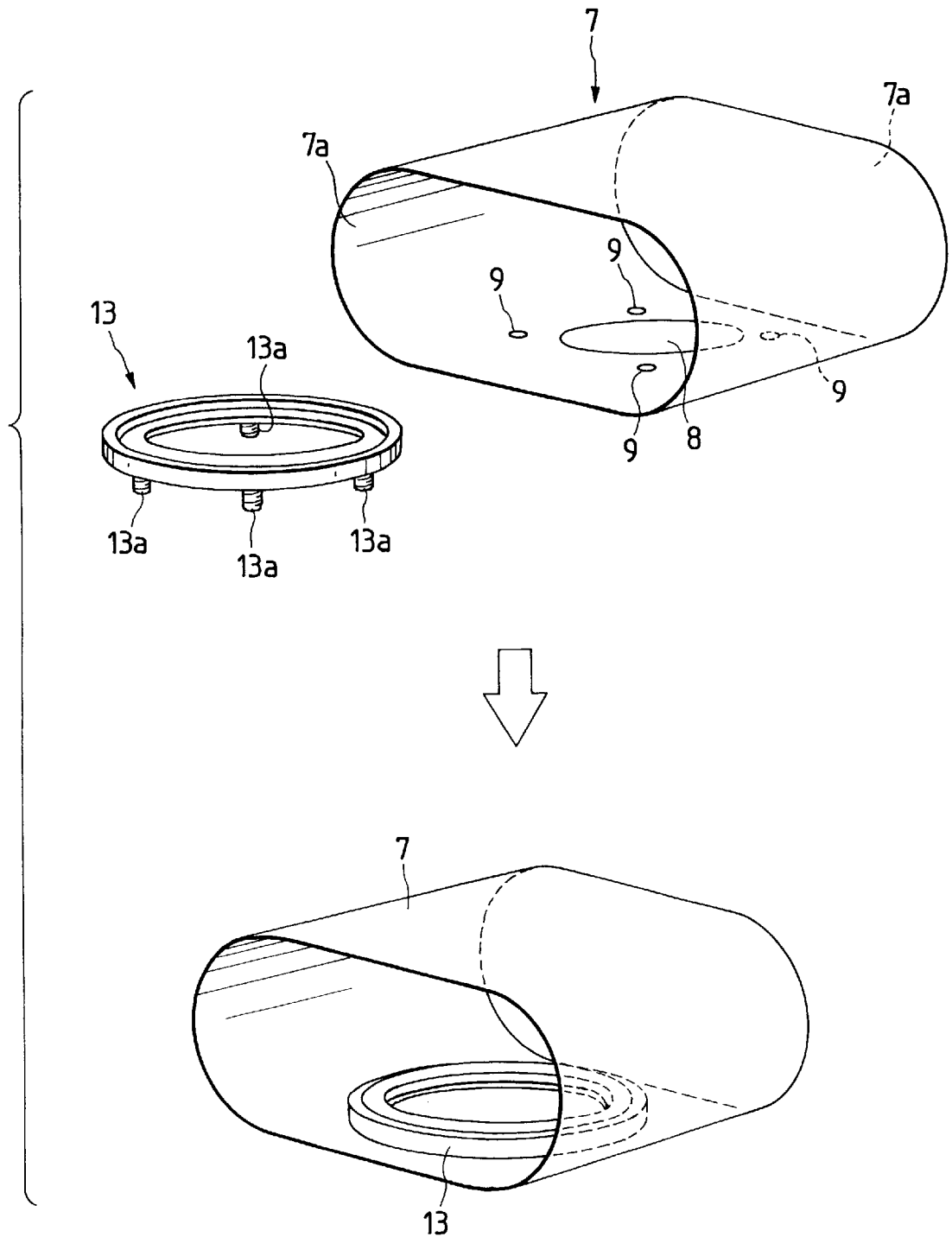
FIG. 9 is a partially exploded perspective view showing the retainer and diffuser and shows the retainer and diffuser fitted to each other without the use of connecting portions.
Figure 10:
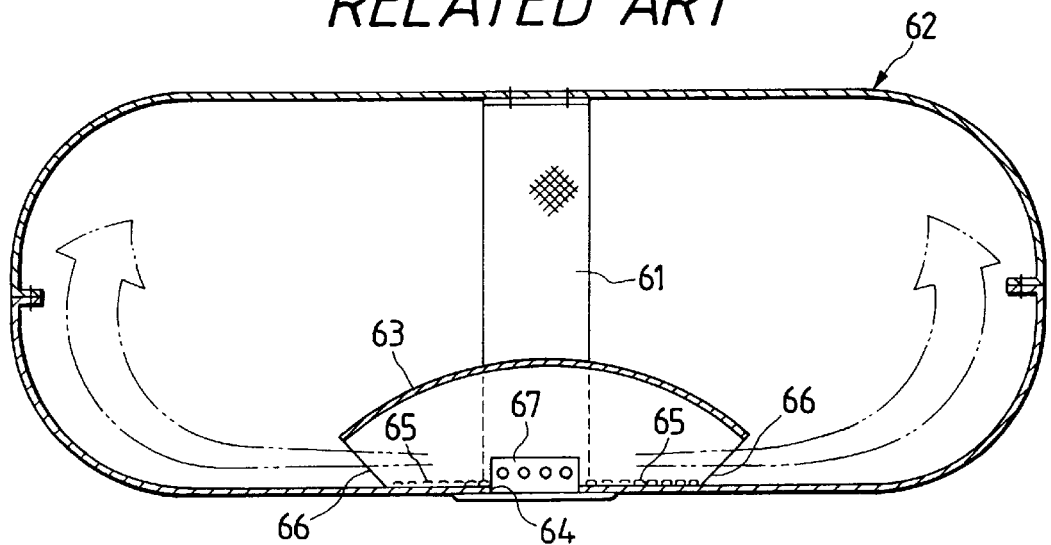
FIG. 10 is a cross-sectional view of a conventional air bag taken along the line 10—10 in FIG. 11.
Figure 11:
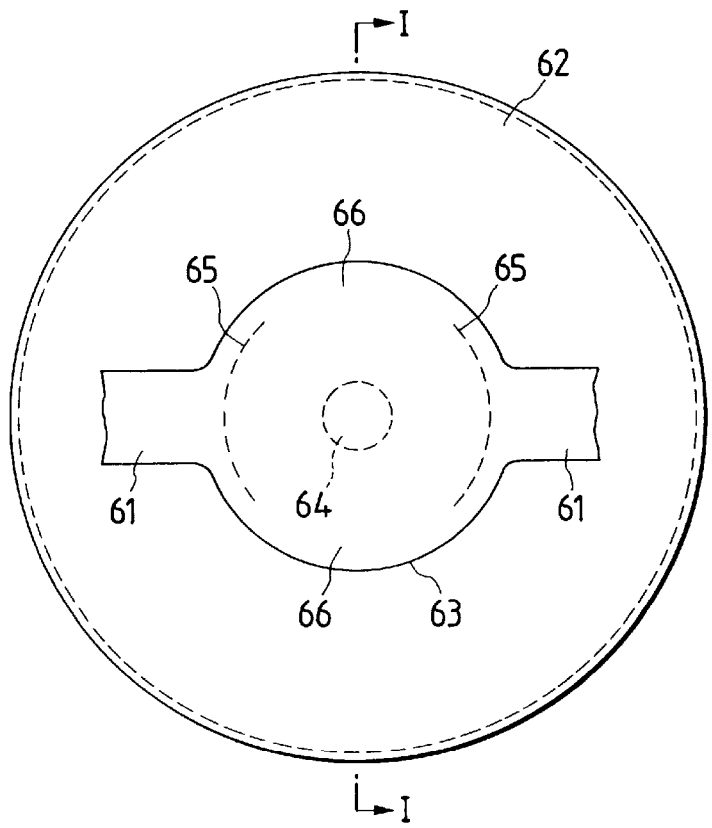
FIG. 11 is a top plan view of a conventional air bag.

As further shown in FIG. 8, the diffuser 7 may be designed such that the portion of the diffuser 7 opposite the gas flowing hole 8 can be pulled out of the inner circumference of the retainer 13 to form a drawn-out region 51. Drawing out the diffuser 7 encloses the retainer 13 such that the diffuser 7 fits snugly thereon before disposing the retainer 13 within the air bag 2. Accordingly, it is easier to assemble the air bag apparatus 1.

Although the embodiment has shown the air bag apparatus 1 attached to the steering wheel W, the principles of the present invention can be applied to a passenger seat air bag apparatus, a side-projection air bag apparatus, and other various air bag apparatus.

What is claimed is:

1. An air bag apparatus comprising:
    an inflatable air bag;
    a tether disposed inside of the air bag constructed and arranged to limit the shape of the air bag when the air bag is inflated;
    a diffuser disposed inside the air bag constructed and arranged to limit flow of inflation gas;
    a retainer disposed inside the air bag, the diffuser being connected to the retainer; and
    a bag holder disposed adjacent to the air bag and the retainer being fastened to the bag holder such that a portion of the air bag is retained between the bag holder and the retainer.

2. The air bag apparatus according to claim 1, wherein the diffuser includes connecting portions attached to the retainer thereby preventing the diffuser from disconnecting from the retainer.

3. The air bag apparatus according to claim 1, wherein the diffuser is generally cylindrical when the air bag is inflated and openings are formed at opposite ends of the cylindrical diffuser thereby allowing inflation gas to flow into the air bag.

4. The air bag apparatus according to claim 1, wherein the air bag is made of woven cloth.

5. The air bag apparatus according to claim 1, wherein the retainer has a securing device constructed and arranged to fasten the retainer to the bag holder.

6. The air bag apparatus according to claim 5, wherein the securing device is a plurality of bolts.

7. The air bag apparatus according to claim 6, wherein the diffuser includes connecting portions attached to the retainer thereby preventing the diffuser from disconnecting from the retainer and further comprising:

mounting holes on the diffuser through which the plurality of bolts are inserted, locking holes on the connecting portions through which the plurality of bolts are inserted, mounting holes on the air bag through which the plurality of bolts are inserted, and mounting holes on the bag holder through which the plurality of bolts are inserted.

* * * * *